United States Patent
Blomberg

(10) Patent No.: US 9,557,453 B2
(45) Date of Patent: Jan. 31, 2017

(54) SANDWICH STRUCTURE UNIT FOR SOLAR COLLECTOR MIRRORS

(71) Applicant: Carbonia Composites AB, Arlöv (SE)

(72) Inventor: Tobias Blomberg, Lomma (SE)

(73) Assignee: Carbonia Composites AB, Arlöv (SE)

( * ) Notice: Subject to any disclaimer, the term of this patent is extended or adjusted under 35 U.S.C. 154(b) by 0 days.

(21) Appl. No.: 14/350,059

(22) PCT Filed: Oct. 4, 2012

(86) PCT No.: PCT/SE2012/051058
§ 371 (c)(1),
(2) Date: Apr. 4, 2014

(87) PCT Pub. No.: WO2013/051999
PCT Pub. Date: Apr. 11, 2013

(65) Prior Publication Data
US 2014/0233121 A1  Aug. 21, 2014

(30) Foreign Application Priority Data
Oct. 7, 2011  (SE) ...................... 1150929

(51) Int. Cl.
*G02B 5/08* (2006.01)
*G02B 7/192* (2006.01)
(Continued)

(52) U.S. Cl.
CPC .. *G02B 5/10* (2013.01); *F24J 2/10* (2013.01); *G02B 5/0808* (2013.01); *F24J 2002/1071* (2013.01); *Y02E 10/40* (2013.01)

(58) Field of Classification Search
CPC . G02B 7/183; G02B 26/0825; G02B 26/0833; G02B 5/08; G02B 7/1815; G02B 26/06; G02B 7/182; G02B 7/181; G02B 26/0816; G02B 7/008; G02B 26/0841; G02B 5/0891; G02B 5/10; G02B 1/02; G02B 1/10; G02B 23/02; G02B 26/0858
See application file for complete search history.

(56) References Cited

U.S. PATENT DOCUMENTS 4,238,265 A  12/1980  Deminet
4,508,425 A   4/1985  Tanaka et al.
(Continued)

FOREIGN PATENT DOCUMENTS

CN        1057527 A   1/1992
CN    201233471 Y   5/2009
(Continued)

OTHER PUBLICATIONS

International Search Report and Written Opinion mailed Jan. 29, 2013, issued in corresponding International Application No. PCT/SE2012/051058, filed Oct. 4, 2012, 11 pages.
(Continued)

*Primary Examiner* — Scott J Sugarman
*Assistant Examiner* — Sharrief Broome
(74) *Attorney, Agent, or Firm* — Christensen O'Connor Johnson Kindness PLLC

(57) ABSTRACT

The present invention discloses a solar panel mirror unit (1) being shaped, such as curved, and having a sandwich structure, said sandwich structure comprising an outermost front reflecting layer (2), intended as the sun reflecting layer and therefore having a reflective coating, said outermost front reflecting layer (2) consisting of a first material having a first thermal expansion coefficient, an intermediate layer (4) having a honeycomb structure and being the core of the sandwich structure, and an innermost rear layer (5) consisting of a second material having a second thermal expansion coefficient, wherein said first and second thermal expansion coefficients are equal or substantially equal.

20 Claims, 1 Drawing Sheet

(51) Int. Cl.
*G02B 5/10* (2006.01)
*F24J 2/10* (2006.01)

(56) References Cited

U.S. PATENT DOCUMENTS

| | | | |
|---|---|---|---|
| 5,151,827 A * | 9/1992 | Ven | F24J 2/1057 359/848 |
| 7,077,532 B1 | 7/2006 | Diver, Jr. | |
| 2008/0043352 A1 * | 2/2008 | Liu | G02B 7/183 359/848 |
| 2008/0121277 A1 * | 5/2008 | Robinson et al. | 136/256 |
| 2009/0004464 A1 * | 1/2009 | Diehl et al. | 428/336 |
| 2009/0301549 A1 * | 12/2009 | Moslehi | H01L 31/042 136/251 |
| 2010/0154888 A1 | 6/2010 | Kadi | |

FOREIGN PATENT DOCUMENTS

| | | |
|---|---|---|
| DE | 36 12 325 A1 | 10/1986 |
| EP | 1 397 621 B1 | 3/2004 |
| EP | 2 031 322 A2 | 3/2009 |
| EP | 2 206 991 A2 | 7/2010 |
| WO | 85/10725 A1 | 4/1985 |
| WO | 2011/151030 A2 | 12/2011 |

OTHER PUBLICATIONS

International Preliminary Report on Patentability and Response to Written Opinion mailed Feb. 4, 2014, issued in corresponding International Application No. PCT/SE2012/051058, filed Oct. 4, 2012, 13 pages.

Extended European Search Report mailed May 18, 2015, issued in corresponding European Application No. 12 83 7849, filed Oct. 4, 2012, 7 pages.

Chinese Search Report dated Sep. 17, 2015, issued in corresponding Chinese Patent Application No. 201280048646.6, filed Oct. 4, 2012, 5 pages.

Communication pursuant to Article 94(3) EPC mailed Jun. 27, 2016, issued in corresponding Application No. EP 12 837 849.4, filed Oct. 4, 2012, 4 pages.

* cited by examiner

SANDWICH STRUCTURE UNIT FOR SOLAR COLLECTOR MIRRORS

FIELD OF INVENTION

The present invention relates to a shaped, such as curved, solar panel mirror unit.

TECHNICAL BACKGROUND

Curved solar panel mirrors have been long known. For instance, U.S. Pat. No. 4,124,277 discloses a concave mirror construction and a method of making concave mirrors, particularly of large focal length. A normally flat rigid glass mirror is held in a concave configuration under bending stress within its elastic limit by a holding layer of substantially dimensionally stable material bonded thereto. The holding layer is formed by a layer of open-ended expansible cellular material sandwiched between layers of pliable and solidifiable dimensionally stable material. The holding layer is bonded to the glass mirror while the mirror is being mechanically held in a concave configuration under bending stress within its elastic limit. The holding layer is cured in situ to a solid and dimensionally stable state which holds the glass mirror in the concave configuration.

Furthermore, U.S. Pat. No. 7,077,532 discloses a solar collector comprising a glass mirror, and a composite panel, wherein the back of the mirror is affixed to a front surface of the composite panel. The composite panel comprises a front sheet affixed to a surface of a core material, preferably a core material comprising a honeycomb structure, and a back sheet affixed to an opposite surface of the core material. The invention may further comprise a sealing strip, preferably comprising EPDM, positioned between the glass mirror and the front surface of the composite panel. The front sheet and back sheet are preferably made of carbon steel.

Moreover, U.S. Pat. No. 4,238,265 discloses a method for producing curved glass solar collectors. The method includes the following steps: (1) a microsheet of glass is drawn from a glass melt; (2) a reflective layer, such as silver, is deposited on one surface of the microsheet; (3) a first flexible backing layer, such as fiberglass, is bonded to the reflective layer; (4) the combination of the microsheet with the reflective layer and the first backing layer is formed over a mandrel which is preferably in the form of a parabolic cylinder; and (5) a honeycombed layer, with a second fiberglass backing layer, is then bonded to the first backing layer. The product produced by the steps 1-5 is then cured so that it retains the desired configuration, i.e. parabolic-cylindrical, after it is removed from the mandrel.

Another production method is disclosed in U.S. Pat. No. 4,422,893, which discloses a method of manufacturing a mirror which comprises the steps of selecting a former of shape complementary to the shape of the desired mirror surface, applying to such former a plurality of mirror elements each constituted by a glass element having a reflective coating on one face thereof, and applying and adhesively bonding directly to such mirror elements a preformed, substantially rigid, unitary structural support. The mirrors disclosed have an outer glass layer which is coated by a metal, such as aluminium or silver, an adhesive layer, such as comprising glue or silicone, and a sheet of expandable glass. According to one embodiment, there is shown a glass layer coated with silver which is bonded by a glue layer of polyester to a honeycomb structure cellular support.

Furthermore, EP1397621 discloses sun reflecting panels which have a sandwich structure having a reflecting surface made of glass, a honeycomb central core of aluminium and two thin outer skins of a high resistance material, where either said outer skins are made of steel or aluminium and where a further layer of glass fibres is inserted between the concave side of the aluminium skin and the thin reflecting mirror, such an arrangement obviating the great differences existing between the thermal expansion coefficient of the mirror and that of the aluminium skin.

One aim of the present invention is to provide an optimal curved solar panel mirror unit which renders high precision and as such also gives low losses when used in a solar panel, and which mirror unit also is cost-effective in comparison with other high-precision panel mirror units. Furthermore, one other purpose of the present invention is to provide a solar panel mirror unit which is very cost-effective in relation to the obtained yield when being used in a solar panel, i.e. which is relatively inexpensive to produce but still gives high precision, regardless of when solar energy is possible to generate.

SUMMARY OF INVENTION

The purposes stated above are achieved by a solar panel mirror unit being shaped, such as curved, and having a sandwich structure, said sandwich structure comprising the following material layers:
  an outermost front reflecting layer, intended as the sun reflecting layer and therefore having a reflective coating, said outermost front reflecting layer consisting of a first material having a first thermal expansion coefficient;
  an intermediate layer having a honeycomb structure and being the core of the sandwich structure; and
  an innermost rear layer consisting of a second material having a second thermal expansion coefficient;
wherein the solar panel mirror exhibits a symmetrical cross section in relation to layer materials on both sides of the intermediate layer and wherein said first and second thermal expansion coefficients are equal or substantially equal.

The expression "exhibits a symmetrical cross section in relation to layer materials on both sides of the intermediate layer" implies that the materials are the same on both sides of the core layer, counted one by one. For instance, if a metal layer is applied directly on one side of the intermediate layer, such a metal layer is also applied directly on the other side of the intermediate layer.

In WO 8501725 there is disclosed a method for the manufacture of a curved face laminated reflector which reflects radiation energy and in particular solar energy. As mentioned on page 3, lines 19-35, the reflector may have two at least substantially identical glass panes of parabolical section, two layers of adhesive material penetrable by radiation and hardened by heat, a combination film being fitted between the layers of adhesive material, said film consisting of a flexible core layer and of a reflecting thin metal layer deposited onto the said core layer. The core layer is made of a polyester film and the metal layer is preferably made of aluminium which has been deposited onto the core layer.

There is no hint in WO8501725 about incorporating a different core structure, such as the honeycomb core as according to the present invention. As disclosed below, the importance of the honeycomb structure according to the present invention is further discussed. Furthermore, the direction of the present invention relating to "exhibiting a symmetrical cross section in relation to layer materials on both sides of the intermediate layer" and the advantages thereof also not addressed in WO8501725.

Moreover, in U.S. Pat. No. 5,151,827 there is shown a mirror for solar rays, which comprises a core on one side of which is disposed a reflective layer and on the other side of which is disposed a protective covering. A separate protective covering is applied to the core between the reflective layer and the core. The reflective layer is a foil which is applied to the latter protective covering. Also in this case, a honeycomb core structure is not hinted or even discussed. The core according to U.S. Pat. No. 5,151,827 is a plastic foam. Moreover, although it is mentioned that if the coverings are made of metal they should be of the same material and have the same thickness, it is further said that the coverings may have different coefficients of thermal expansion, that is consisting of different material types, and in such cases the thickness of the coverings may vary in relation to each other. As understood from the description, this latter direction is not at all intended or desirable according to the present invention, as it is clearly stated that the present invention is limited to only a solar panel mirror exhibiting a symmetrical cross section in relation to layer materials on both sides of the intermediate layer and where said first and second thermal expansion coefficients are equal or substantially equal.

According to one preferred embodiment of the present invention, the front reflective layer on a rear side thereof is adhered directly to the intermediate layer, and wherein the intermediate layer is adhered to the rear layer, so as to form the shaped (curved) solar panel mirror unit having only three layers in total. As may be understood, if fewer layers are used, productions cost may be kept low. In relation to the expression "only three layers", this should be interpreted as material layers and not e.g. possible glue or e.g. a painted coating on the back, which both are further disclosed below. Furthermore, the expression "adhered directly to" should not be seen as an active step in a production method, but instead as a clear statement of the placement of the layers in relation to each other. In other words, according to this preferred embodiment of the present invention there are no additional layers which are placed in between the front reflective layer and the intermediate layer or between the intermediate layer and the rear layer. Furthermore, this also implies that the actual adhesion during the production may in fact be performed in many different ways, and also in different order in relation to the layers being adhered to each other. For example, this adhesion may also be performed simultaneously.

Moreover, the front reflective layer should be understood to be the outermost layer of the sandwich construction, and there may not be any layers provided outside of the front reflective layer. The same applies for the innermost rear layer, i.e. there may not be any additional material layers provided on top of the rear layer. It should, however, be noted that the rear layer may be coated with e.g. a white paint or other colour on the inside or outside of that layer, to prevent any sun reflection on that side. Moreover, the rear layer may for instance comprise two glass layers, however this is not preferred as it increases the handling during production of the mirror unit.

As understood from above, the mirror unit according to the present has an outer reflective layer being made of a material having a thermal coefficient being the same or substantially the same as that of the material of the inner layer. Additionally to these layers, the mirror unit also has a core layer. In a preferred embodiment of the present invention, the mirror unit does not comprise any additional material layers than these layers. The only additives besides these layers are the reflective coating on the inside of the reflective layer, the adhesive agents applied between the layers and also the possible paint being applied on the inside or outside of the rear glass layer.

There is no such construction shown or hinted in any of the patent documents disclosed above. Not any of the products disclosed in the prior art have a sandwich construction consisting of only two similar material layers positioned directly on one side each of the intermediate core layer. For instance U.S. Pat. No. 4,124,277, U.S. Pat. No. 7,077,532 and EP1397621 disclose structures having additional layers, in these cases additional metal layers. In the cases of U.S. Pat. No. 4,238,265 and U.S. Pat. No. 4,422,893, there are also additional layers incorporated in the structures disclosed, however not specifically metal layers.

The benefits of the construction according to the present invention are several. First of all, the sandwich construction normally consists only of two different materials (e.g. glass and core as discussed below), which renders the construction to be cost effective in comparison to other constructions. Secondly, the construction gives high precision when being used in a solar panel mirror. Thirdly, the mirror unit according to the present invention also gives high yields in a solar panel, independently on when they are being used during sun hours, i.e. during the time when solar energy may be generated. These positive attributes or features are achieved by the construction. As the two materials on each side of the core have the same thermal expansion coefficient, e.g. by both being made of glass, no bimetal effects are obtained, and the same thermal induced expansion or contraction are achieved on both sides of the core when such sandwich construction are exposed to temperature deviation. This is an essential feature to be able to achieve high precision in a sandwich construction for solar panels. This is e.g. not the fact when different materials are provided in a sandwich construction on different sides of the core.

In relation to what has been described above, it should once again be mentioned that the present invention embodies a sandwich construction exhibiting a symmetrical cross section when comparing layer materials on both sides of the core (intermediate layer). This implies that for instance a construction made of two layers on both sides of the core, e.g. one first metal layer, e.g. a steel layer, and one second glass material layer provided on top of the metal layer, also is embodied of the present invention. Such a sandwich construction exhibits the intended properties, however as the construction comprises two additional layers, it will be more expensive to produce than the preferred mirror unit according to the present invention. However, for instance a structure having one additional material layer on either side of the core, rendering the construction to have an unsymmetrical cross section, such as in the known constructions disclosed above, is not embodied of the present invention.

SPECIFIC EMBODIMENTS OF THE INVENTION

Figure 1:
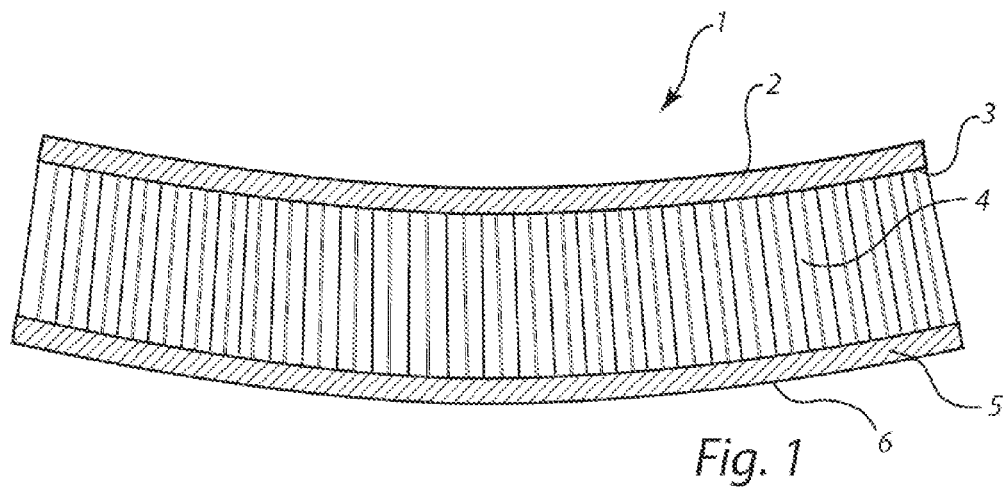
FIG. 1 shows a sandwich mirror unit according to the present invention.

As understood from above, essential properties of the sandwich structure according to the present invention are inter alia that the thermal expansion are kept low and are the same on both sides of the mirror unit, that the bi-metal effect is prevented and that the units are inexpensive in comparison.

According to one preferred embodiment of the present invention, the outermost front reflecting layer consists of a glass material and the innermost rear layer consists of a glass material. As the materials on both sides are glass, and no other material layers are additionally provided in the sandwich construction, the construction of the present invention is very weather resistant, as the lifespan greatly will exceed ten years. This is an essential feature for the mirror units according to the present invention, regardless of the material choice of the outermost front reflecting layer and the innermost rear layer. As the most ideal locations for solar energy production are characterized by dry and sunny climate, like desserts, these locations also provide very large temperature deviations over one day. It is not unusual that the temperature is sub zero in the morning and reaches 40-50° C. in the afternoon. With glass layers according to the present invention, the weather and temperature influence is minimized. For instance, metals or composites may cause problems when temperature changes as metals exhibit different thermal expansion than glass materials. Such thermal expansion dissimilarities are undesirable as this creates high inner tensions that will decrease the usable lifespan and decrease the precision and as such the yield of generated solar energy.

In relation to the description above, it should be noted that the present invention embodies other materials than glass, however glass is preferred. One example is coated steel panels on both sides of the core. The important concept features of the present invention is to have outer and inner materials exhibiting the same (or substantially the same) thermal expansion coefficients, to have no further material layers than outer, core and inner layers so as to keep productions costs low and to provide solar mirror units exhibiting enhanced properties in terms of high precision (all sunny hours), high weather resistance and long working life.

According to one specific embodiment of the present invention, the outermost front reflecting layer and the innermost rear layer consist of the same type of glass material.

According to the present, the reflective coating of the outermost front reflecting layer may be applied on either the outside or inside layer thereof. It should, however, be noted that it may be difficult to provide a reflective coating exhibiting long time weather resistance. Therefore, according to one preferred embodiment of the present invention, the reflective coating is applied on the rear side of the outermost front reflecting layer. In this case, the reflective coating is protected from outer influence.

The core cannot have any structure or consist of any type of material. The core must enable for the entire sandwich construction to be shaped without having the glass layers flexing back to its original shape. One should realize that there will always exist a force for the glass layers to go back to its original plane appearance after being shaped, and the intermediate core layer must resist such force. A very suitable structure for withstanding these forces is the so called honeycomb structure. The honeycomb structure is effective in taking over and transferring shear stresses developing when shaping or bending the sandwich structure, and transmitting different loads between the layers when necessary, such as during e.g. windy days or the like. Furthermore, such structure is effective for increasing the section modulus of the panel which is important during the shaping and for the possibility of transferring loads between the layers. Moreover, the thickness of the core, i.e. the honeycomb, is also important for the performance of the sandwich structure unit according to the present invention. The thickness of the honeycomb core should not exceed 50 mm. Preferably the thickness of the honeycomb core is in the range of 5-30 mm, such as in the range of 10-20 mm which is even better. A preferred range may be around 15 mm in thickness, such as in the range of 12-18 mm.

Other such parameters being of interest for the performance are inter alia the weight of the solar panel mirror unit and also the average solar reflectivity. The weight of the unit is obviously as low as possible, i.e. given that no other performance parameter is affected negatively. Preferably, the weight of the solar panel mirror unit does not exceed 10 kg per sq. m. A possible interesting weight range is from 2 to 8 kg per sq. m, such as in the range of 2-6 kg per sq. m, e.g. 6 kg per sq. m, or 3 kg per sq. m which is even better.

The average solar reflectivity is preferably above 80%, advantageously at least 90%, such as preferably above 93%, e.g. 95%, or 99% which of course is a high and preferred value.

Another interesting parameter is the shape deviation, which is defined as the local normal vector deviation orthogonal to a plane intersecting the sandwich structure mirror unit. The shape deviation should not exceed +/−2 mrad (milliradians), preferably not be above +/−1 mrad, such as not above +/−0.75 mrad. Values in the range of e.g. from +/−0.75 mrad and at least down to +/−0.25 mrad are possible to obtain and are preferred.

Furthermore, according to one embodiment of the present invention, the intermediate layer is made of aluminium or an aluminium alloy, such as e.g. being a honeycomb structure made of aluminium. Aluminium is a material exhibiting preferred properties, as it is a lightweight metal, in a honeycomb structure, giving both stability but also shaping (curving) possibility. According to yet another specific embodiment, the intermediate layer is made of a composite material such as, but not limited to, a fiber reinforced honeycomb. There are, however, materials which are not suitable for the core, such as plastic materials.

The shaping of the sandwich structure according to the present invention may be performed by different methods, such as e.g. by compression moulding or by vacuum forming. Other techniques may also be possible.

Furthermore, the combining of different layers to each other may also be performed in different ways. According to one specific embodiment of the present invention, each layer is adhered to the adjacent layer by means of a glue substance. The type and quantity of such glue substance may vary depending e.g. on the thickness of the glass layers intended to be adhered to the core. The type of the glue substance may for instance be a cross-linked polymer substance, such as e.g. a cross-linked epoxy glue, or a polyurethane polymer.

The glass type of the glass layers may also vary. According to one embodiment of the present invention, the front reflecting layer is a thin glass. Thin glasses are normally used in solar constructions, and are normally up to about 2.0 mm in thickness. The thin glasses for solar mirrors are provided with a reflective coating on the back, such as a coating made of silver or copper, or an alloy thereof, or the like. For the front layer, it is of importance to use a high precision glass type as this is the layer receiving the solar beams.

According to another embodiment of the present invention, also the rear layer is a thin glass. For the rear layer, the glass type and thickness choice is more a matter of production and cost of production than being of direct relevance for the precision performance. As this glass layer should not act with the solar beams, the precision is not affected directly from that type of glass. The type and thickness of glass is, however, indirectly important. Firstly, the choice of a glass material ensures for no difference in thermal expansion on this side of the mirror compared to the front side. Secondly, the thickness of the glass may have an influence on the shaping, also depending on the choice of intermediate layer. For instance, fact is that it may be more cost-effective to use a thicker glass type as such glasses are more inexpensive than thin glasses. On the other side, for production reasons, it may be more convenient to use thin glasses on both sides of the intermediate layer. Therefore, according to one embodiment of the present invention, the rear glass is a thicker glass than the front reflective layer. Furthermore, the outside of the rear glass layer may be painted to prevent sun reflection on that side.

Furthermore, the shaping type may be different. According to one specific embodiment, the solar panel mirror unit is double-curved. A double-curved surface is a surface which is curved in two different directions. Consequently, a single-curved surface is a surface being curved in only one direction. An illustrative example is a sphere in comparison to a cylinder, where the sphere has a double-curved surface, and the cylinder is only single-curved. It should be noted that the solar panel mirror units according to the present invention also may be single-curved.

The solar panel mirror units according to the present invention are used together with other such units in solar panel mirrors. The units are joined together beside one another to build an entire panel of units. The front reflective layer is of course facing towards the direction from which the sun beams should be received and reflected. The panel units may have any suitable shape for facilitation of this joining of units to one another. Suitable shapes are e.g. quadratic or rectangular shapes. Furthermore, the number of units put together may vary, but up to e.g. above hundreds is fully possible. As contemplated from above, the present invention also embodies a solar panel mirror comprising several solar panel mirror units according to the present invention.

DETAILED DESCRIPTION OF THE DRAWING

FIG. 1 shows one first embodiment of the present invention. The solar panel mirror unit 1, which is curved, comprises an outermost front reflecting layer 2, intended as the sun reflecting layer, being made of a thin glass, e.g. about 1.0 mm thick, and having a rear side 3 with a sun reflective layer, e.g. of silver. Furthermore, the honeycomb core being the intermediate layer 4 is preferably made of aluminium, and is for instance 15 mm thick, but may be thicker or thinner to provide for the required stability. The innermost rear layer 5 is also made of a glass material, in this case a thin glass having about the same thickness as the reflective layer 2. The rear layer 5 may have an outside 6 which suitably is painted to prevent for sun reflection. In this sense, it should be noted that the inside of the rear layer 5 may be painted or varnished instead of the outside 6.

Figure 2:
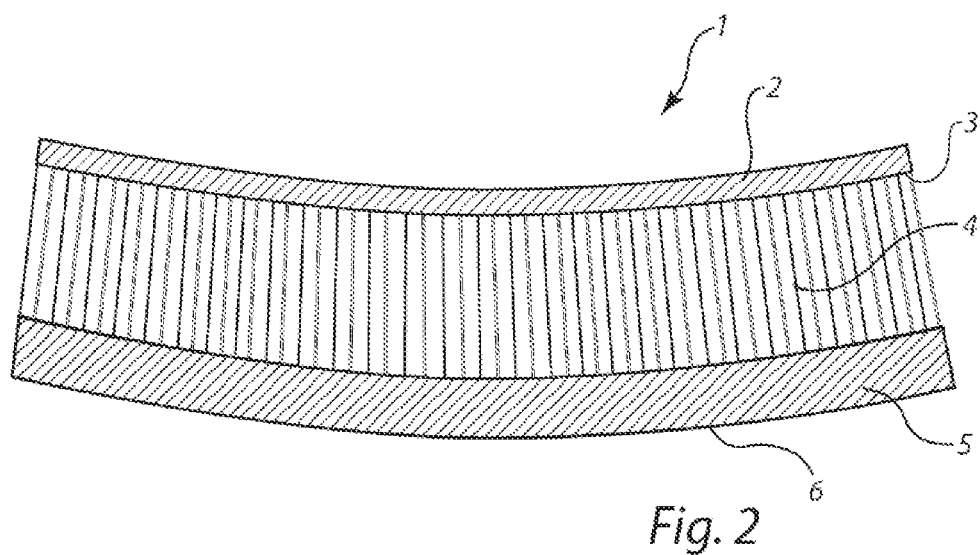
FIG. 2 also shows a sandwich mirror unit according to the present invention.

FIG. 2 shows another embodiment according to the present invention, where the rear layer 5 is considerably thicker than the front reflecting layer 2. In this case the rear layer 5 can be of glass or a material with very similar thermal expansion, and may for instance have a thickness of 1.5-5 mm.

The invention claimed is:

1. Solar panel mirror unit being shaped and having a sandwich structure, said sandwich structure comprising the following structural layers:
    a first structural layer in the form of an outermost front reflecting layer, intended as the sun reflecting layer and therefore having a reflective coating, said outermost front reflecting layer consisting of a first material having a first thermal expansion coefficient;
    a second structural layer in the form of an intermediate layer having a structure composed of a honeycomb geometry and being the core of the sandwich structure, wherein the honeycomb geometry of the intermediate layer is composed of a non-plastic material and the thickness of the structure composed of a honeycomb geometry does not exceed 50 mm; and
    a third structural layer in the form of an innermost rear layer consisting of a second material having a second thermal expansion coefficient;
    wherein the solar panel mirror exhibits a symmetrical cross section in relation to layer materials on both sides of the intermediate layer,
    wherein said first and second thermal expansion coefficients are equal or substantially equal, and wherein the average solar reflectivity is at least 90%;
    wherein the front reflective layer on a rear side thereof is adhered in face-to-face contact with the intermediate layer; and
    wherein the intermediate layer is adhered to the rear layer so as to form the shaped solar panel mirror unit having only three structural layers in total.

2. Solar panel mirror unit according to claim 1, wherein the outermost front reflecting layer consists of a glass material and the innermost rear layer consists of a glass material.

3. Solar panel mirror unit according to claim 2, wherein the outermost front reflecting layer and the innermost rear layer consist of the same type of glass material.

4. Solar panel mirror unit according to claim 1, wherein the reflective coating is applied on the rear side of the outermost front reflecting layer.

5. Solar panel mirror unit according to claim 1, wherein the honeycomb geometry of the intermediate layer is made of aluminum or an aluminum alloy.

6. Solar panel mirror unit according to claim 1, wherein the honeycomb geometry of the intermediate layer is made of a composite material.

7. Solar panel mirror unit according to claim 1, wherein each layer is adhered to the adjacent layer by means of a glue substance.

8. Solar panel mirror unit according to claim 7, wherein the glue substance is a cross-linked polymer.

9. Solar panel mirror unit according to claim 1, wherein at least one of the front reflecting layer and rear layer is composed of a thin glass.

10. Solar panel mirror unit according to claim 1, wherein the solar panel mirror unit is selective from the group consisting of double-curved and single-curved.

11. Solar panel mirror comprising several solar panel mirror units according to claim 1.

12. Solar panel mirror unit being shaped and having a sandwich structure, said sandwich structure comprising:
    the following material layers in sequence: an outermost front reflecting layer, then an intermediate layer, and then an innermost layer:

the outermost front reflecting layer having a reflective coating to reflect the sun, said outermost front reflecting layer:
consisting of a first material having a first thermal expansion coefficient;
having an outer surface and an inner surface adjacent to the intermediate layer; and
comprising a reflective coating on the inner surface;
the intermediate layer having a structure composed of a honeycomb geometry and being the core of the sandwich structure, wherein the honeycomb geometry of the intermediate layer is composed of a non-plastic material and the thickness of the structure composed of a honeycomb geometry does not exceed 50 mm; and
the innermost rear layer consisting of a second material having a second thermal expansion coefficient; and
wherein the solar panel mirror exhibits a symmetrical cross section in relation to layer materials on both sides of the intermediate layer.

13. Solar panel mirror unit according to claim 12, wherein the outermost front reflecting layer consists of a glass material and the innermost rear layer consists of a glass material.

14. Solar panel mirror unit according to claim 12, wherein the outermost front reflecting layer and the innermost rear layer consist of the same type of glass material.

15. Solar panel mirror unit according to claim 12, wherein the reflective coating is applied on the rear side of the outermost front reflecting layer adjacent the intermediate layer.

16. Solar panel mirror unit according to claim 12, wherein the honeycomb geometry of the intermediate layer is made of aluminum or an aluminum alloy.

17. Solar panel mirror unit according to claim 12, wherein the honeycomb geometry of the intermediate layer is made of a composite material.

18. Solar panel mirror unit according to claim 12, wherein at least one of the front reflecting layer and near layer is composed of a thin glass.

19. Solar panel mirror unit according to claim 12, wherein the solar panel mirror unit is selective from the group consisting of double-curved and single-curved.

20. Solar panel mirror unit being shaped and having a sandwich structure, said sandwich structure comprising the following material layers:
an outermost front reflecting layer having a reflective coating to reflect the sun, said outermost front reflecting layer consisting of a first material having a first thermal expansion coefficient and comprising a unitary structure;
an intermediate layer having a structure composed of a honeycomb geometry and being the core of the sandwich structure, wherein the honeycomb geometry of the intermediate layer is composed of a non-plastic material and the thickness of the structure composed of a honeycomb geometry does not exceed 50 mm; and
an innermost rear layer consisting of a second material having a second thermal expansion coefficient; and
wherein the solar panel mirror exhibits a symmetrical cross section in relation to layer materials on both sides of the intermediate layer.

* * * * *